(12) United States Patent
Kamimura et al.

(10) Patent No.: US 7,103,431 B1
(45) Date of Patent: Sep. 5, 2006

(54) AUDIO PLAYER

(75) Inventors: Toru Kamimura, Shiga (JP); Masanao Yoshida, Osaka (JP); Toshihiro Waguri, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 559 days.

(21) Appl. No.: 10/049,616

(22) PCT Filed: Aug. 16, 2000

(86) PCT No.: PCT/JP00/05495

§ 371 (c)(1),
(2), (4) Date: Feb. 21, 2002

(87) PCT Pub. No.: WO01/15142

PCT Pub. Date: Mar. 1, 2001

(30) Foreign Application Priority Data

Aug. 25, 1999 (JP) .................................. 11-237702

(51) Int. Cl.
*G06F 17/00* (2006.01)
*G10L 21/00* (2006.01)
*G11B 5/09* (2006.01)
*G06F 15/16* (2006.01)

(52) U.S. Cl. ...................... 700/94; 704/500; 369/47.12

(58) Field of Classification Search .................. 381/22; 704/500–504; 700/94

See application file for complete search history.

(56) References Cited

U.S. PATENT DOCUMENTS

| | | | | |
|---|---|---|---|---|
| 5,999,899 A | * | 12/1999 | Robinson ..................... | 704/222 |
| 6,119,091 A | * | 9/2000 | Huang et al. ............... | 704/500 |
| 6,366,544 B1 | * | 4/2002 | Scibora .................... | 369/47.12 |
| 6,449,227 B1 | * | 9/2002 | Heo ........................ | 369/47.15 |
| 6,549,942 B1 | * | 4/2003 | Janky et al. ............... | 709/219 |
| 6,721,710 B1 | * | 4/2004 | Lueck et al. .............. | 704/500 |
| 6,816,491 B1 | * | 11/2004 | Fujii et al. ................. | 370/394 |
| 6,845,398 B1 | * | 1/2005 | Galensky et al. ........... | 709/231 |
| 2003/0055657 A1 | * | 3/2003 | Yoshida et al. ............ | 704/500 |

FOREIGN PATENT DOCUMENTS

| | | |
|---|---|---|
| JP | 63-228200 | 9/1988 |
| JP | 06-250700 | 9/1994 |
| JP | 10-232700 | 9/1998 |
| JP | 11-167400 | 6/1999 |

* cited by examiner

*Primary Examiner*—Laura A. Grier
(74) *Attorney, Agent, or Firm*—Westerman, Hattori, Daniels & Adrian, LLP

(57) ABSTRACT

A sound reproducing apparatus (10) includes a slot (16) to which a memory card (18) is attached. A decoding software for decoding sound data is stored in an audio file recorded on the memory card (18). The decoding software is loaded into a RAM (22b) by a CPU (20) when it is not possible to decode the sound data by the decoding software stored on a ROM (22a). Therefore, a DSP (22) decodes sound data read from the same audio file in accordance with the decoding software loaded from the audio file.

2 Claims, 14 Drawing Sheets

| HEADER | SECURITY INFO. | CONTENTS INFO. | ADDITIONAL INFO. | COMPRESSED AND ENCRYPTED MUSIC DATA |
|---|---|---|---|---|

FIG.5

| ADDITIONAL INFO. 1 | ePAC DECODING SOFTWARE - TYPE B |
|---|---|
| ADDITIONAL INFO. 2 | ePAC DECODING SOFTWARE - TYPE A |
| ADDITIONAL INFO. 3 | COMMENT BY ARTIST(TEXT) |
| | |

FIG.6

| ADDITIONAL INFO. 1 | ePAC DECODING SOFTWARE - TYPE A |
|---|---|
| ADDITIONAL INFO. 2 | VIRTUAL SOUND SOFTWARE - TYPE A |
| ADDITIONAL INFO. 3 | ARTIST IMAGE (JPEG) |
| | |

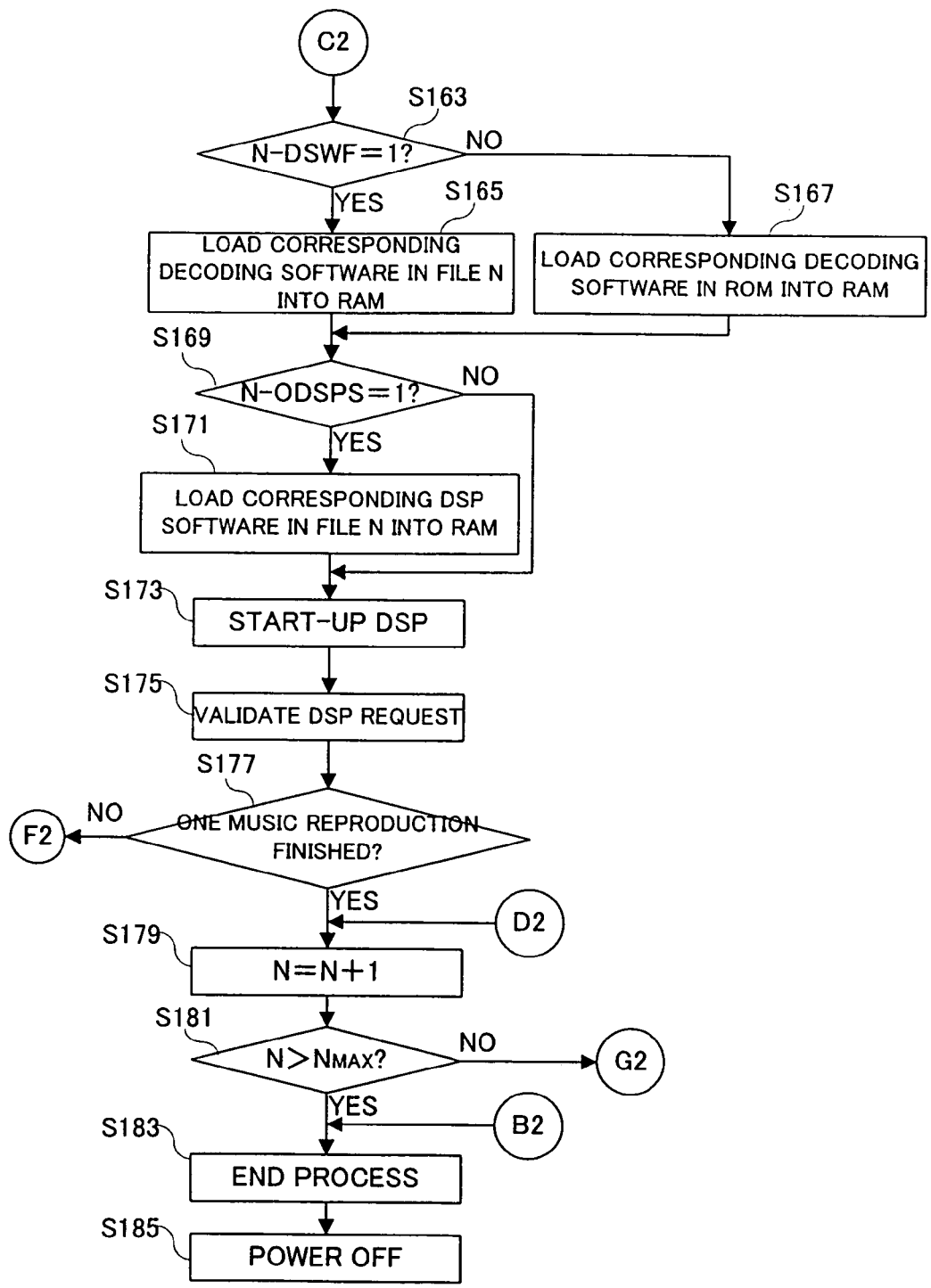

AUDIO PLAYER

TECHNICAL FIELD

The present invention relates to a sound reproducing apparatus. More specifically, the present invention relates to a sound reproducing apparatus which reproduces a sound signal recorded on a detachable recording medium in an encoded state.

PRIOR ART

With respect to a format for encoding/decoding a sound signal, there are MP3 (MPEG-1 AUDIO Layer 3), TwinVQ, etc. In a conventional sound reproducing apparatus, a decoding program corresponding to any one of such the plurality of formats was stored in a memory, and a sound signal encoded by the same format was decoded by the decoding program.

However, as described above, there are a plurality of encoding/decoding formats of a sound signal. Therefore, it was not possible to listen to a sound signal not corresponding to one's sound reproducing apparatus.

SUMMARY OF THE INVENTION

Therefore, it is a primary object of the present invention to provide a sound reproducing apparatus capable of reproducing a sound signal encoded by any format.

A sound reproducing apparatus according to the present invention, comprises: an attaching means for detachably attaching a recording medium on which a sound signal encoded in a first format and a first decoding program in accordance with the first format are recorded; a storing means for storing a second decoding program in accordance with a second format; a determining means for determining whether or not the first format and the second format are coincident each other; a validating means for validating both one of the first decoding program and the second decoding program on the basis of a determination result of the determining means; a decoding means for decoding the sound signal by the decoding program validated by the validating means; and an outputting means for outputting the sound signal decoded by the decoding means.

According to the present invention, a first decoding program in accordance with a first format and a sound signal encoded in the first format are recorded on a recording medium. Such the recording medium is detachably attached by the attaching means. On the other hand, a second decoding program in accordance with a second format is stored on an internal memory. The determining means determines whether or not said first format and the second format are coincident each other, and the validating means validates both one of the first encoding program and the second encoding program on the basis of the determining result. The decoding means decodes the sound signal by the validated decoding program, and the validated sound signal is outputted by the outputting means.

Thus, one of the first decoding program and the second program is validated on the basis of the determining result by the determining means, and therefore, it is possible to reproduce a sound signal encoded by any kind of format.

In a certain example of the present invention, the decoding means adopts a first type processing system, and the first decoding program corresponding to the first type and the first program corresponding to a second type are recorded on the recording medium. The loading means included in the validating means loads the first decoding program corresponding to the first type from the recording medium when the determining result represents disagreement.

In another example of the present invention, the sound signal encoded in the first format and the first decoding program are stored in a common data file.

In another example of the present invention, the sound signal is a music signal.

A sound reproducing apparatus according to the present invention, comprises: an attaching means for detachably attaching a recording medium on which a sound signal encoded in a predetermined format and a decoding program in accordance with the predetermined format are recorded; a loading means for loading the decoding program from the recording medium; a decoding means for decoding the sound signal by the decoding program loaded by the loading means; and an outputting means for outputting the sound signal decoded by the decoding means.

According to the present invention, a decoding program which follows a predetermined format and a sound signal encoded in a predetermined format are recorded on a recording medium, and such the recording medium is detachably attached by the attaching means. The loading means loads the decoding program from the recording medium, and the decoding means decodes the aforementioned sound signal by the loaded decoding program. The decoded sound signal is outputted from the outputting means.

Thus, the decoding program is loaded from the recording medium, and the sound signal is decoded by the loaded decoding program, therefore, it is possible to reproduce a sound signal encoded in any kind of format.

In a certain example of the present invention, the decoding means adopts a first type processing system, and a first decoding program corresponding to the first type and a first decoding program corresponding to the second type are recorded on the recording medium. The loading means loads from the recording medium the first decoding program corresponding to the first type.

In another example of the present invention, the sound signal encoded in the first format and the first decoding program are stored in a common data file.

In still another example of the present invention, the sound signal is a music signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing one example of an additional information management table.

FIG. 6 is an illustrative view showing another example of the additional information management table.

FIG. 16 is a flowchart showing yet still another part of operation of the FIG. 11 embodiment.

BEST FORM FOR PRACTICING THE INVENTION

Figure 1:
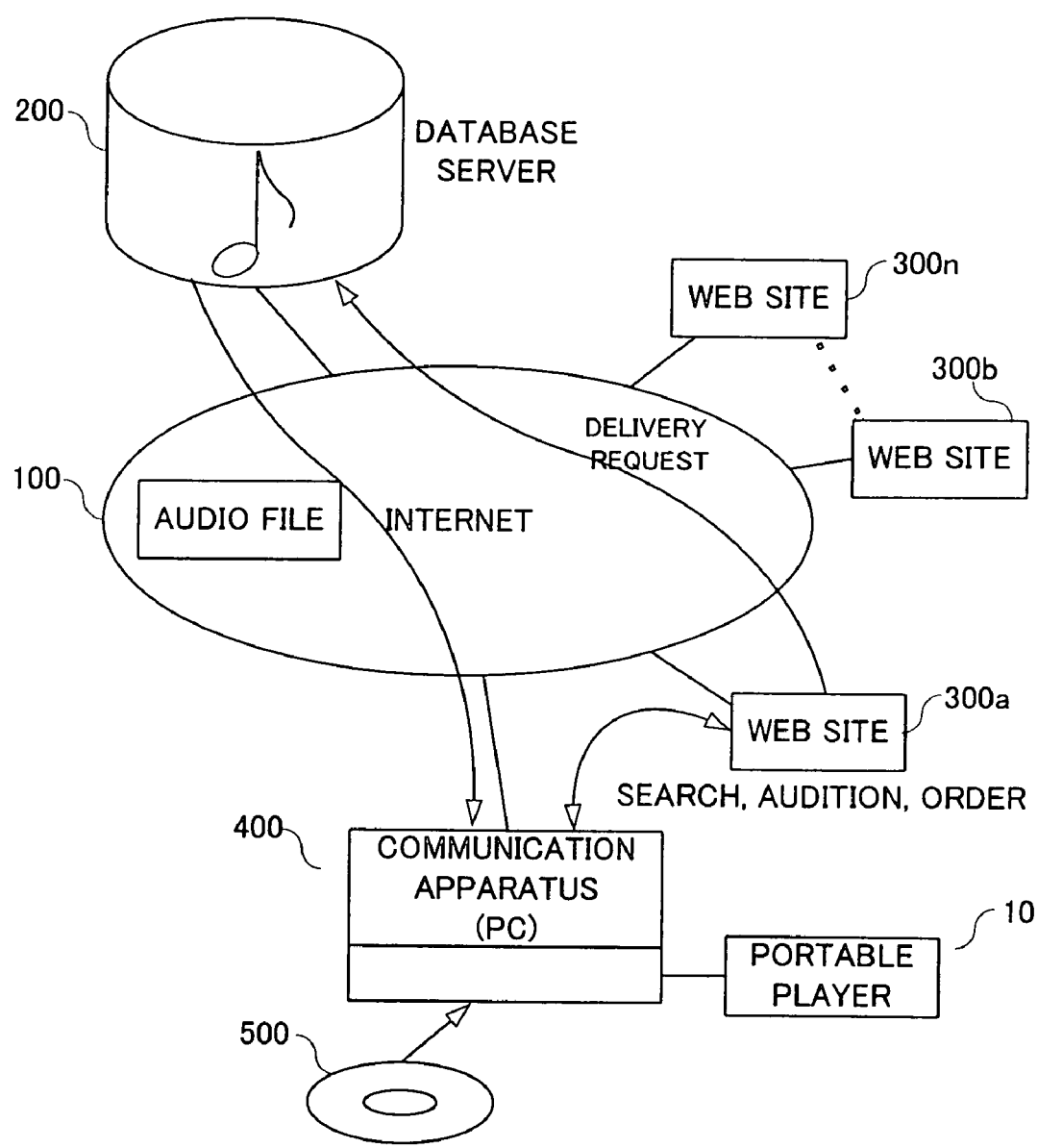
FIG. 1 is an illustrative view showing one embodiment of the present invention.

Referring to FIG. 1, a mobile-type sound recording reproducing apparatus 10 of this embodiment is connected to a communication terminal 400, e.g. a personal computer. The communication terminal 400 is connected to an Internet 100 via a telephone circuit, and an operator can gain access to a plurality of WES sites 300a, 300b . . . , 300n via the Internet 100.

Among them, the WEB site 300a is a site for delivering music. If the operator gains access to the site so as to order a desired music (song), the WEB site 300a requests to a database server 200 to deliver the ordered music via the Internet 100. The database server 200 transmits a data file (audio file) of the requested music to the ordering source communication terminal 400 via the Internet 100. The transmitted audio file is downloaded onto a hard disk of the communication terminal 400. Note that the audio file is created for each music. If the operator orders a music album including a plurality of musics, a plurality of corresponding audio files are then downloaded.

Figure 2:
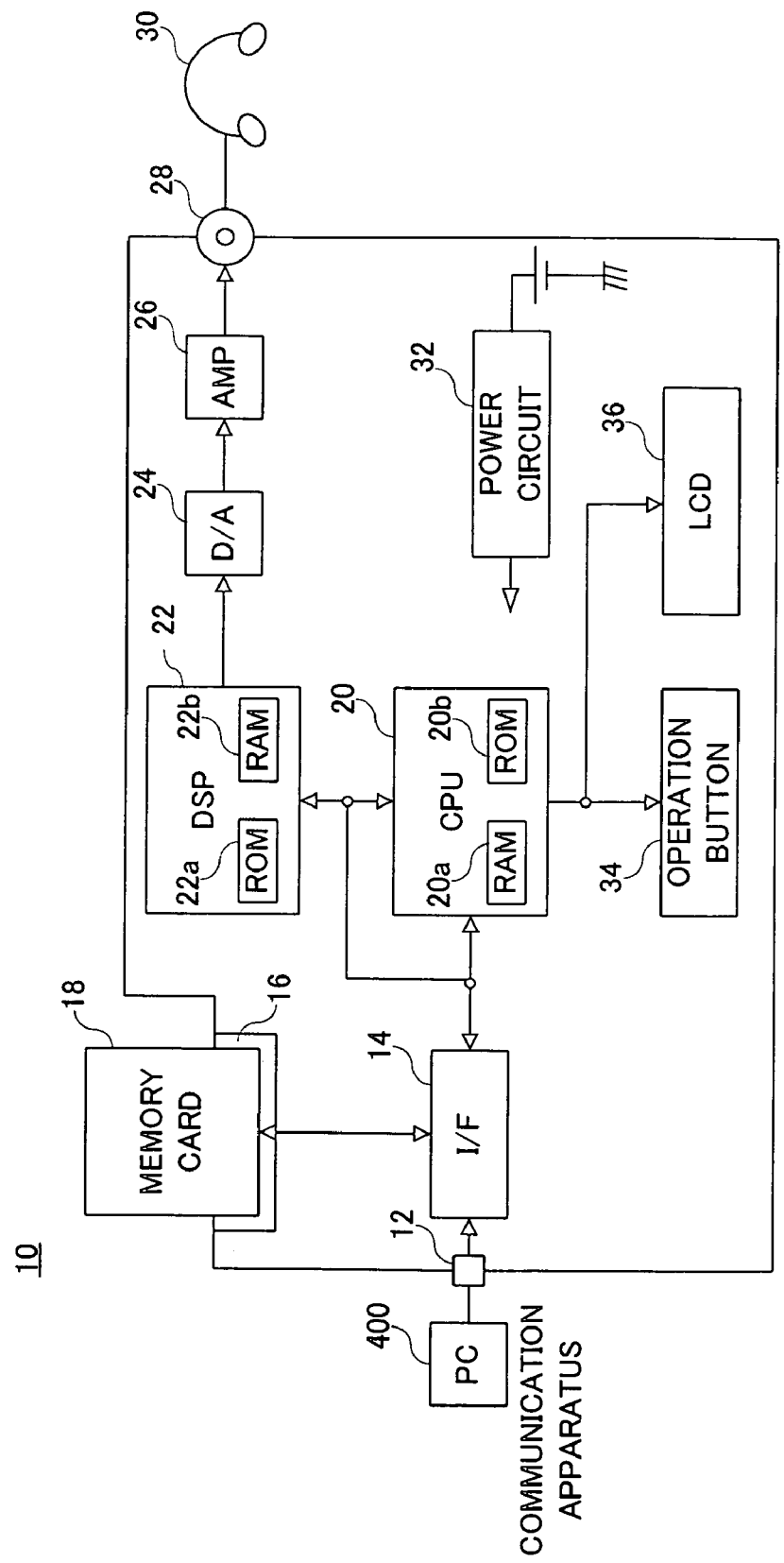
FIG. 2 is a block diagram showing one part of the FIG. 1 embodiment.
Figures 3, 4:
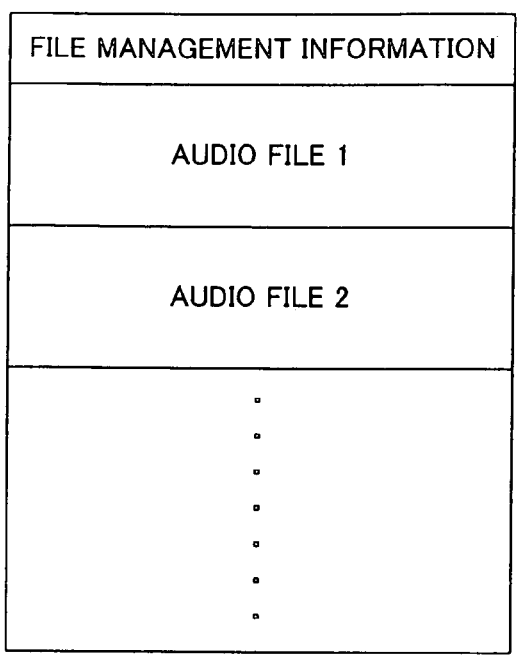
FIG. 3 is an illustrative view showing a memory card.
FIG. 4 is an illustrative view showing data structure of an audio file.

Referring to FIG. 2, the downloaded audio file is inputted to the sound recording reproducing apparatus 10 through an input terminal 12. The inputted audio file is recorded on a memory card 18 via an interface 14. A plurality of audio files are stored on the memory card 18 as shown in FIG. 3. Note that the memory card 18 is a detachable recording medium to be electrically connected to the interface 14 when inserted in a slot 16.

Data structure of an audio file recorded on the memory card 18 is described in FIG. 4. Following an audio file header, security information, contents information and additional information are stored in this order. One music data (sound data) subjected to a compression process and an encryption process based on a predetermined format is stored following the additional information. The security information is herein encryption key information to prevent the audio file from being unlawfully copied, and the encryption is broken by using the encryption key information.

The contents information includes compression format information indicating in what format the music data is compressed, encryption format information indicating in what format the music data is encrypted, and an additional information management table indicating what kind of data are included as the additional information. In addition, also included are information associated with this audio file, that is, a name of an artist, a music title, an album title, a name of a composer, and a name of a producer, etc.

The additional information includes a decoding software (decoding program) for decompressing music data, an equalizing software for arranging a music tone, image data of an artist, and text data such as an artist's message, an interesting story at a time of an album production, etc.

With regard to a compression format, there are a plurality of formats, such as MP3, TwinVQ, AAC, AC-3 (Dolby Digital), ePAC, etc. Therefore, when the music data included in the audio file is compressed in the ePAC format, the compression format information indicates "ePAC", and when the music data is compressed in the MP3 format, the compression format information indicates "MP3".

Furthermore, a corresponding decoding software varies depending on a type (for example, 16-bits operation or 24-bits operation) of DSP (Digital Signal Processor) provided in a reproducing apparatus. That is, if the DSP is a 16-bits operation processor, only a type A decoding software is started. On the other hand, if the DSP is a 24-bits operation processor, only a type B decoding software is started. Therefore, in a case that the decoding software included in the additional information follows the ePAC format and also corresponds to a 16-bits operation DSP, decoding software information of "ePAC decoding software—type A" is included in the additional information management table. In addition, in a case that two decoding softwares which follow the ePAC format are included in the additional information so as to correspond to both 16-bits operation DSP and 24-bits operation DSP, decoding software information of "ePAC decoding software—type A" and "ePAC decoding software—type B" are included in the additional information management table. Note that the decoding software information is a concept including compression format information and type information.

In this embodiment, it is preferred that decoding softwares which correspond to both the type A and the type B and follows a common compression format be stored in the audio file. In this case, information shown in FIG. 5, for example is stored on the additional information management table. According to FIG. 5, additional information 1 is "ePAC decoding software—type B", additional information 2 is "ePAC decoding software—type A", and additional information 3 is "artist's comment (text)". In a case that only one decoding software is stored in the audio file, and instead, a DSP software which exhibits special effects appropriate to each music is stored, information shown in FIG. 6, for example is stored on the additional information management table. According to FIG. 6, additional information 1 is "ePAC decoding software—type A", additional information 2 is "virtual sound software—type A", and additional information 3 is "artist's image (JPEG)". It is noted that the virtual sound software is effective in reproducing a music recorded in a concert with a realistic sensation.

Following two methods are considered with regard to storing a decoding software, and related compression format information and type information. One is to store a decoding software, compression format information and type information in the audio file on a database server side. The other is that the communication terminal 400 previously acquires a plurality of decoding softwares from the WEB site 300a or the database server 200 so as to store, upon purchasing an audio file, the corresponding decoding software, the compression format information and the type information into the audio file.

Figure 7:
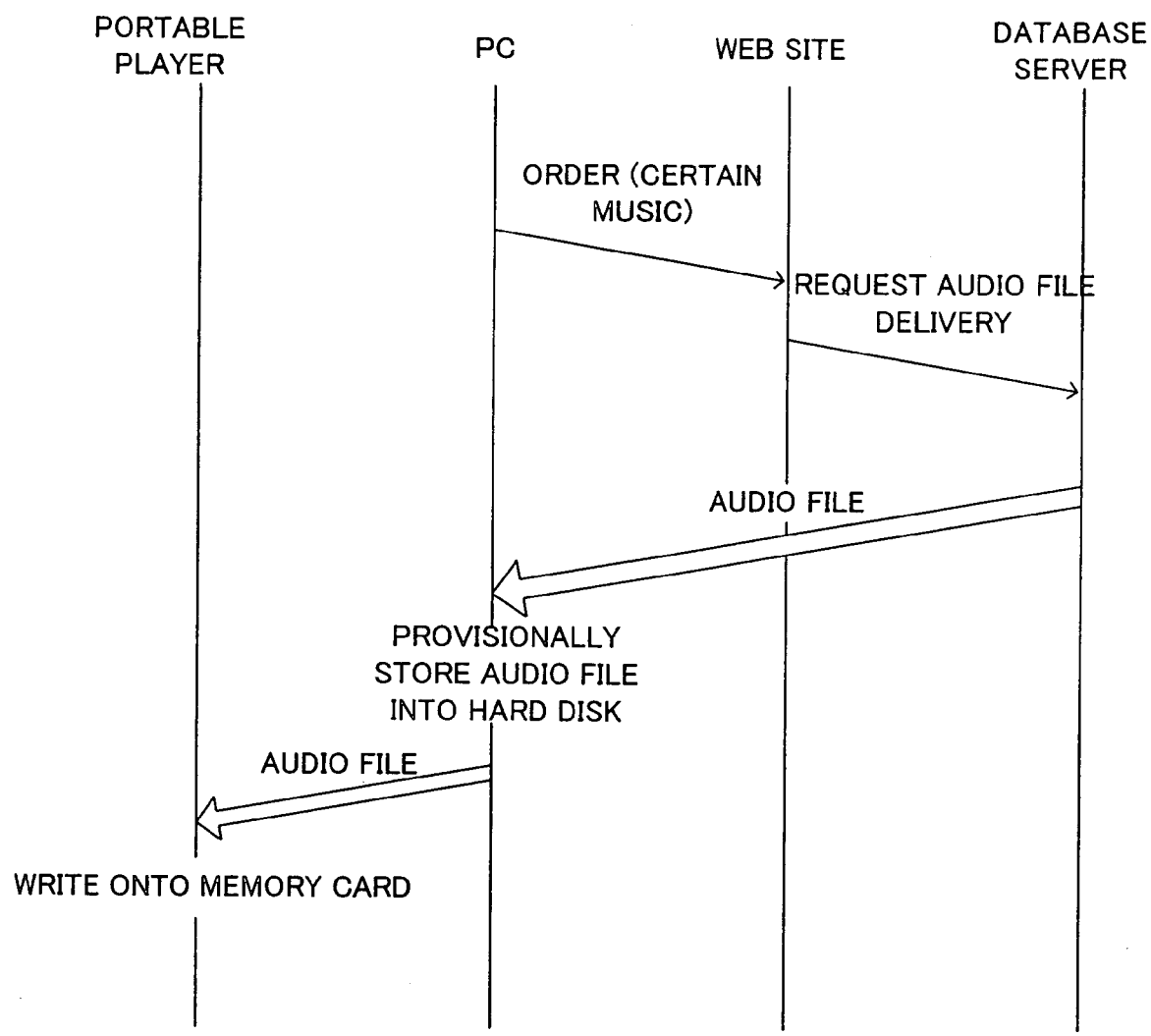
FIG. 7 is an illustrative view showing one part of operation of the FIG. 1 embodiment.

Regarding the first method, specific descriptions are made by referring to FIG. 7. Firstly, an operator orders a desired song to the WEB site 300a. Then, the WEB site 300a requests to the database server 200 to deliver the ordered song. In response to the delivery request, the database server 200 creates an audio file including desired music data, a corresponding decoding software, compression format information and type information, and delivers the created audio file to the communication terminal 400 of the operator side. The delivered audio file is provisionally written onto a hard disk of the communication terminal 400, and subsequently recorded onto the memory card 18 of the sound recording reproducing apparatus 10 by an operation of the operator.

Figure 8:
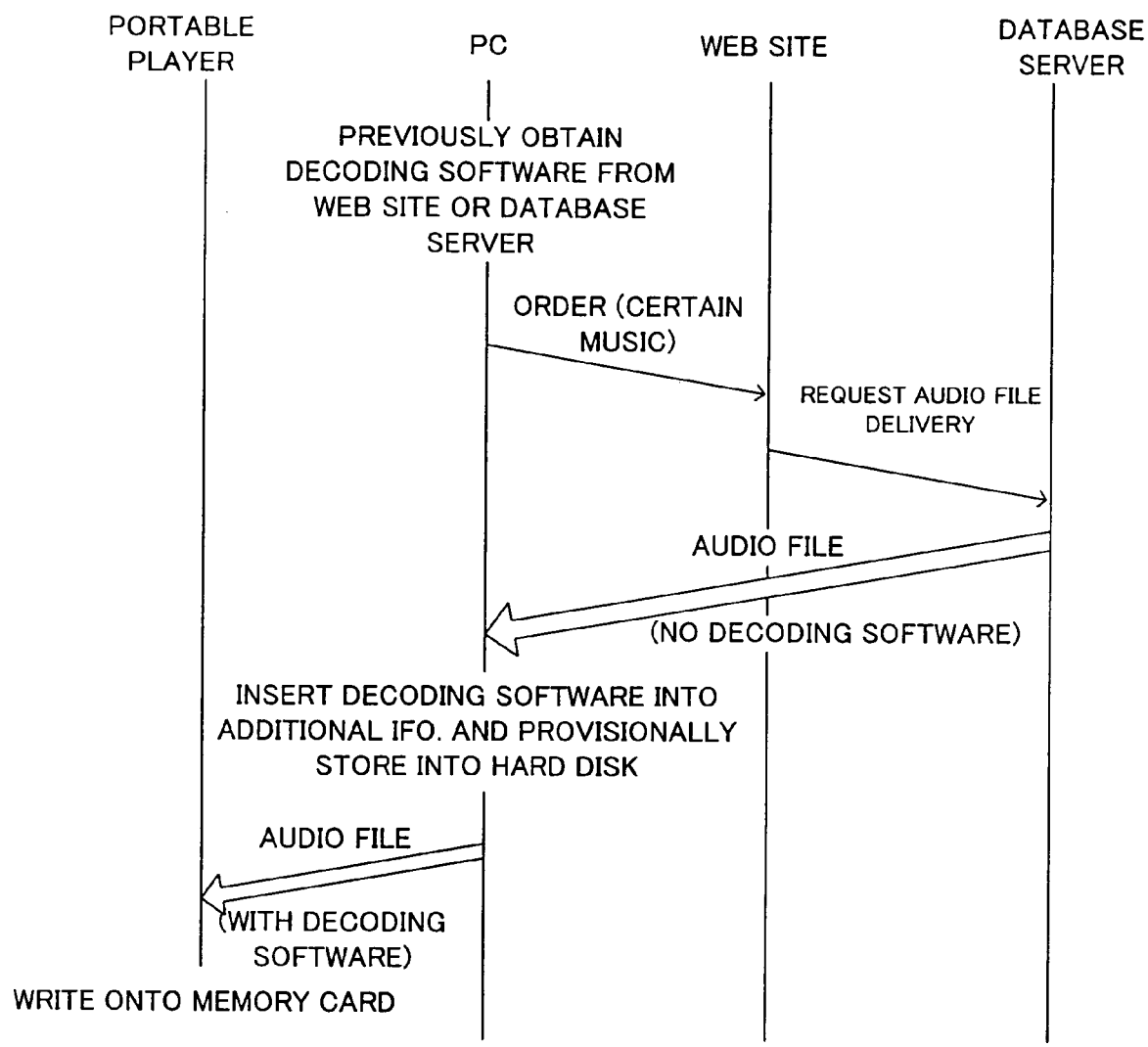
FIG. 8 is an illustrative view showing another part of operation of the FIG. 1 embodiment.

The second method is described in FIG. 8. The operator previously downloads a plurality of decoding softwares from the WEB site 300a or the database server 200, and subsequently orders a desired song to the WEB site 300a. Then, as in the above, the WEB site 300a requests to the database server 200 to deliver the desired audio file. The database server 200 in receipt of the delivery request downloads an audio file not including the decoding software onto the communication terminal 400. Upon completion of the audio file download, the communication terminal 400 stores the decoding software necessary to decompress music data, together with the compression format information and the type information, and records onto the memory card 18 the audio file subjected to such the storing process.

It is noted that music data reproduced from a CD 500 may also be recorded on the memory card 18. In this case, an audio file of structure shown in FIG. 4 is created by the communication terminal 400.

In reproducing the audio file thus recorded on the memory card 18, a CPU 20 included in the sound recording reproducing apparatus 10 processes flowcharts shown in FIGS. 9 to FIG. 12. It is noted that the flowchart processes are started in response to a power input.

Firstly, the CPU 20 executes an initializing process in a step S1. A count value N on a file counter 20c is set to "1" by this process. The CPU 20 subsequently determines whether or not the memory card 18 is inserted in a slot 16 in a step S3. If NO is determined, such the message is displayed on an LCD 36 in a step S5, and then the process returns to the step S3. When the operator inserts the memory card 18 responding to the message, the CPU 20 proceeds from the step S3 to a step S7 so as to read file management information shown in FIG. 3 from the memory card 18 via the interface 14. The file management information is information for managing a data file recorded on the memory card 18, and used to comprehend what kinds of data are stored in each data file.

Subsequently, the CPU 20 determines whether or not the audio file is present on the memory card 18 in a step S 9. At this time, the aforementioned file management information is used. If there is no audio file, the CPU 20 displays such the message on the LCD 36 in a step S11, and after a predetermined time lapse, the power is turned off in a step S85 via an end process in a step S83. To the contrary, if there is one audio file on the memory card 18, the CPU 20 proceeds to a step S13 so as to read header, security information and contents information from an audio file N in the memory card 18. In the step S15, it is determined whether or not the audio file N is an unlawfully copied file based upon the read security information.

If the audio file N is an unlawfully copied file, the CPU 20 displays such the message on the LCD 36 in a step S17. The file counter 20c is incremented in a step S19, and it is determined whether or not the count value N exceeds a total number of audio files $N_{max}$ in a step S21. If $N \leq N_{max}$ is determined in the step S21, the CPU 20 returns to the step S13 so as to carry out a same process to a next audio file. On the other hand, if $N > N_{max}$ is determined in the step S21, the CPU 20 proceeds to the step S83. As a result, the power is turned off via the end process.

If the audio file N is a legitimately obtained file, the CPU 20 determines NO in the step S15, and proceeds to a step S23. In this step, it is determined whether or not a compression format of the audio file N is coincident with a format of the decoding software previously prepared in a ROM 22a of a DSP 22.

That is, there is previously at least one decoding software in the ROM 22a provided in the DSP 22. If the DSP 22 is a 16-bits operation processor, decoding softwares such as "MP3-type A" and "AAC-type A", for example, is stored in the ROM 22a. Herein, if the compression format information included in the contents information read in the step S13 is "ePAC", it is not possible to decode the music data included in the audio file N by the decoding software in the ROM 22a.

It is thus determined whether or not a format of the decoding software stored in the ROM 22a is coincident with a compression format of the music data in the step S23. If the determination results is coincident, a DSWF flag is reset in a step S27, and then the process proceeds to a step S29.

On the other hand, if the determination result shows a disagreement in the step S23, the CPU 20 proceeds to a step S24 so as to determine whether or not a decoding software appropriate for the DSP 22 is stored in the audio file N. As displayed above, if the type disagrees between the decoding software and the DSP 22, the decoding software is not to be started by the DSP 22. Therefore, it is determined whether or not a type of the decoding software stored in the audio file N is coincident with the type of DSP 22 by referring to the additional information management table in the step S24. If neither type of decoding softwares is coincident with the type of DSP 22, the CPU 20 displays such the message on the LCD 36 for a predetermined time period in a step S25, and then proceeds to a step S79. In contrast, if at least one type of the decoding software is coincident with the DSP 22, the CPU 20 sets a DSWF flag in a step S26, and then proceeds to the step S29.

In the step S29, by referring to the additional information management table, it is determined whether or not other DSP softwares having a type coincident with the DSP 22 (for example, the above described virtual sound software-type A) are stored in the audio file N. Herein, if there is any other DSP software having an identical type, the CPU 20 sets the ODSPS flag in a step S31. On the other hand, if there is no other DSP software having an identical type, the CPU 20 resets the ODSPS flag in a step S33.

Thus, the contents of the audio file N is comprehended, and the DSWF flag and the ODSPS flag are set in a predetermined state. Therefore, a preparation for a reproduction is completed, and from then on, a process corresponding to an operation of an operation button 34 by an operator is carried out.

When the operator instructs to reproduce by the button operation, the CPU 20 determines YES in a step S35, and then determines a state of the DSWF flag in a step S63. Herein, if the DSWF flag is a set state, the CPU 20 proceeds to a step S65. By referring to the additional information management table, the decoding software corresponding to the DSP 22 is read from the memory card 18 out of decoding softwares stored in the audio file N, and loaded into the RAM 22b provided in the DSP 22 in the step S65. If the DSP 22 is a 16-bits operation processor, and the audio file N has the additional information management table shown in FIG. 5 or 6, a decoding software of "ePAC-type A" is loaded into the RAM 22b.

In contrast, if the DSWF flag is a reset state, the CPU 20 loads a corresponding decoding software within the ROM 22a onto the RAM 22b in a step S67. In other words, if the compression format of the audio file N is "MP3", a decoding software of "MP3-type A" stored in the ROM 22a is loaded onto the RAM 22b.

Therefore, a decoding software necessary to decode the music data stored in the audio file N is surely obtained in the RAM 22b.

Subsequently, the CPU 20 determines a state of the ODSPS flag in a step S69. If the ODSPS flag is a reset state, the CPU 20 directly proceeds to a step S73. On the other hand, if the ODSPS flag is a set state, the CPU 20 loads the DSP software (its type agrees) other than decoding softwares onto the RAM 22b from the audio file N in a step S71, and then proceeds to the step S73. Accordingly, if the audio file N has the additional information management table shown in FIG. 6, the virtual sound software is loaded onto the RAM 22b.

Subsequently, the CPU 20 starts up the DSP 22 in the step S73, and then validates a request from the DSP 22 to the CPU 20 in a step S75. On the basis of this request, a music data is read from the audio file N recorded on the memory card 18. The read music data has been subjected to an encryption process and a compression process as described above, and such the music data is supplied to the DSP 22 via the interface 14. First, the DSP 22 breaks a music data encryption, and then decodes in accordance with the decoding software stored in the RAM 22b. Furthermore, the DSP 22 applies such a process as to exhibit special effects to the music data as required. The music data which is applied to such the processes is converted into a sound signal (analog signal) by a D/A converter 24, and then the converted sound signal is outputted to a headphone 30 via an amplifier 26 and an output terminal 28. As a result, the operator can listen to the music through a headphone 30.

The CPU 20 determines whether or not a reproduction of one music data is completed in a step S77. Herein, if NO is determined, the process returns to the step S35, and if YES is determined, the process proceeds to the step S79. A count value N of a file counter 20c is incremented in the step S79, and it is determined whether or not the counter value N exceeds a total number $N_{max}$ of audio files in a succeeding step S81. If $N \leq N_{max}$ holds true, the CPU 20 returns to the step S13 so as to carry out a same process to a next audio file. On the other hand, if $N > N_{max}$ holds true, the power is turned off via an end process because the reproduction of all the audio files is completed.

If the operator instructs to skip while the music data is being reproduced, the CPU 20 proceeds from step a step S37 to a step S39 so as to invalidate a request outputted from the DSP 22. As a result, the reproduction of the music data from the memory card 18 is suspended. The CPU 20 proceeds to the step S79 after the process in the step S39. Therefore, unless the audio file N being reproduced before the skip has been instructed is a last file, the reproduction of the next audio file N starts.

If the operator instructs to do a fast-forwarding while the music data is being reproduced, the CPU 20 proceeds from a step S41 to a step S43 so as to skip reproduced music data by one block. That is, music data equal to one music stored in the audio file is divided into a plurality of blocks, and the CPU 20 advances the music data to be reproduced one block ahead. Subsequently, it is determined whether or not the reproduction of one music is completed in a step S45, if YES is determined, the process proceeds to the step S79. In the meanwhile, if No is determined in the step S45, it is determined whether or not a cancellation of the fast-forwarding is instructed in a step S47. If NO is herein determined, the process returns to the step S43, and if YES is determined, the process returns to the step S35. Since the request of the DSP 22 is invalidated in neither steps of S41 to S47, the reproduction of the music data is resumed from a moment when the fast-forwarding is cancelled If a pause is instructed while the music data is being reproduced, the CPU 20 determines YES in a step S49, and then invalidates a request from the DSP 22 in a step S51. This interrupts to reproduce the music data. Subsequently, if instructed to cancel the pause, the CPU 20 determines YES in a step S53, and returns to the step S35 after revalidating the request from the DSP 22 in a step S55. As a result, the reproduction of the music data is resumed.

If it is instructed to stop while the music data is being reproduced, the CPU 20 determines YES in a step S57, and returns to the step S35 after invalidating the request from the DSP 22 in a step S59. As a result, the reproduction of the music data is suspended.

If it is instructed to turn off the power while the music data is being reproduced, the CPU 20 determines YES in a step S61, and then proceeds to the step S83. Due to this, the CPU 20 turns off the power via an end process.

According to this embodiment, a decoding software for decoding the music data is stored in the audio file N recorded on the memory card 18 with the music data. This decoding software is loaded into the RAM 22b when it is not possible to decode the music data by the decoding software stored in the ROM 22a. Therefore, even in a case that an audio file not to be decoded by the decoding software stored in the ROM 22a is recorded on the memory card 18, the music data included in this audio file is to be reproduced.

There are a plurality of types regarding the DSP 22. Decoding softwares capable of responding to different types are stored in the audio file taking into account a fact that the DSP cannot process decoding softwares in different types. Accordingly, it becomes possible to reproduce an audio file even in a case of a sound recording reproducing apparatus having any type of DSP.

Figure 9:
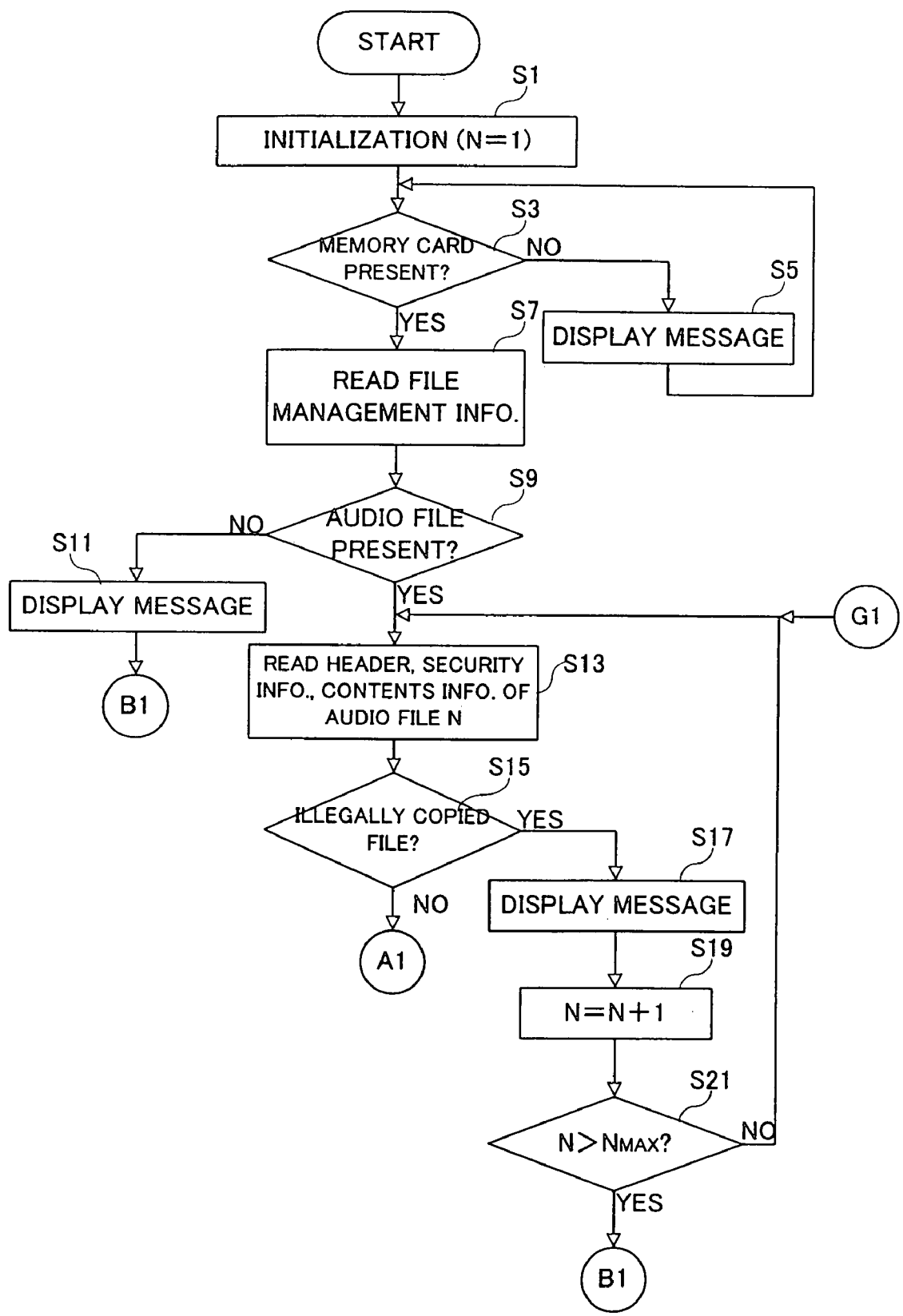
FIG. 9 is a flowchart showing one part of operation of the FIG. 1 embodiment.
Figure 10:
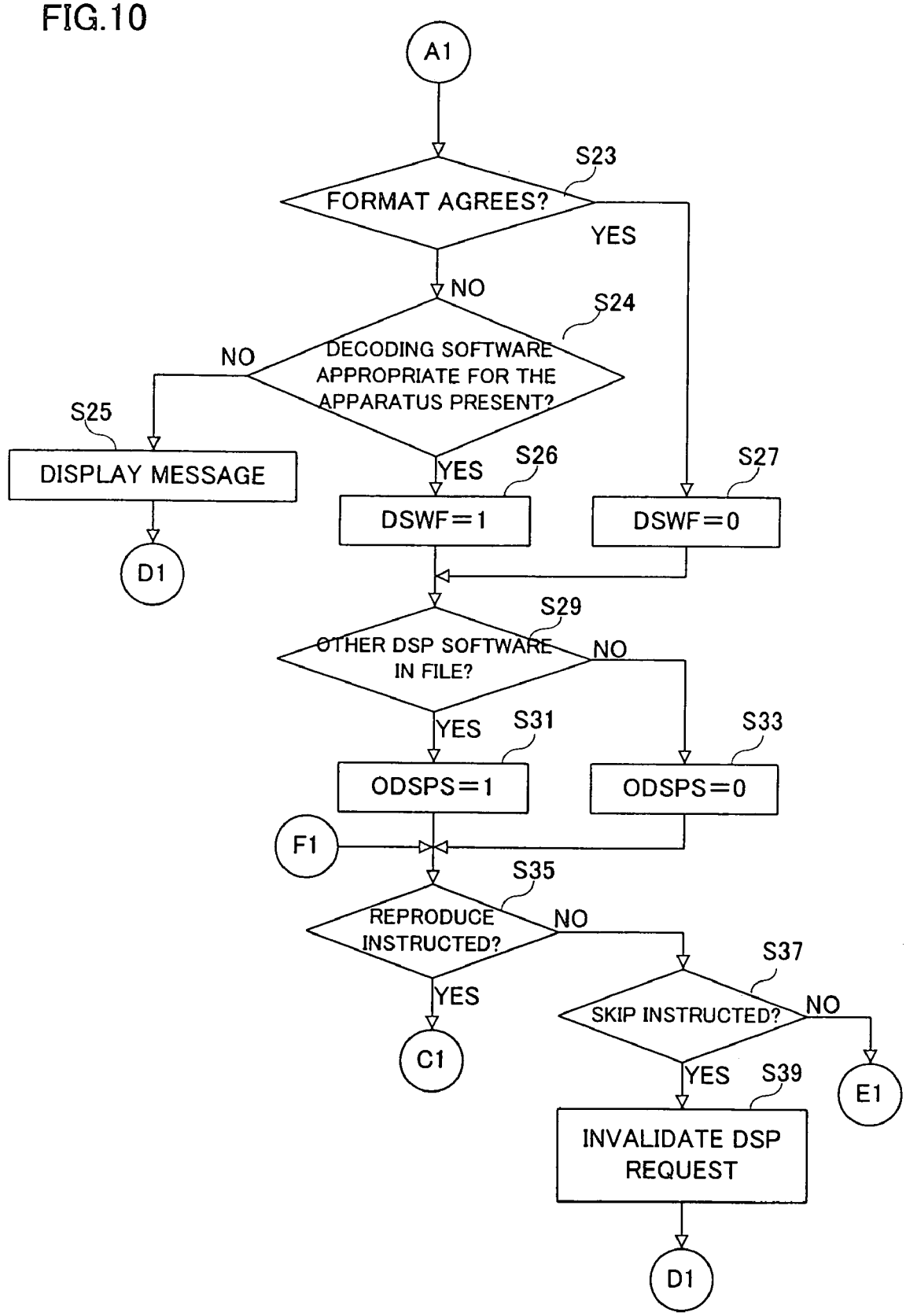
FIG. 10 is a flowchart showing another part of operation of the FIG. 1 embodiment.
Figure 11:
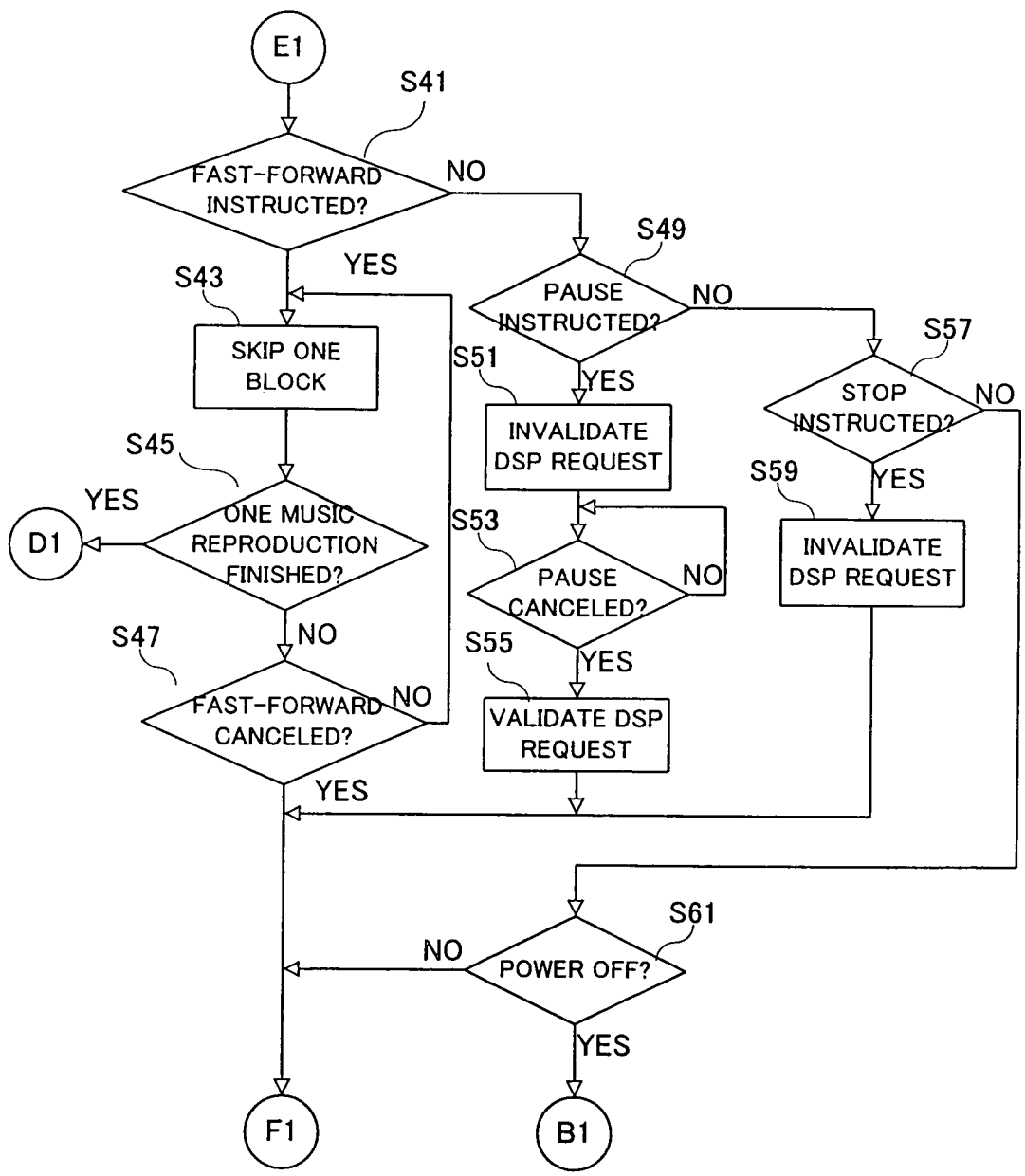
FIG. 11 is a flowchart showing still another part of operation of the FIG. 1 embodiment.
Figure 12:
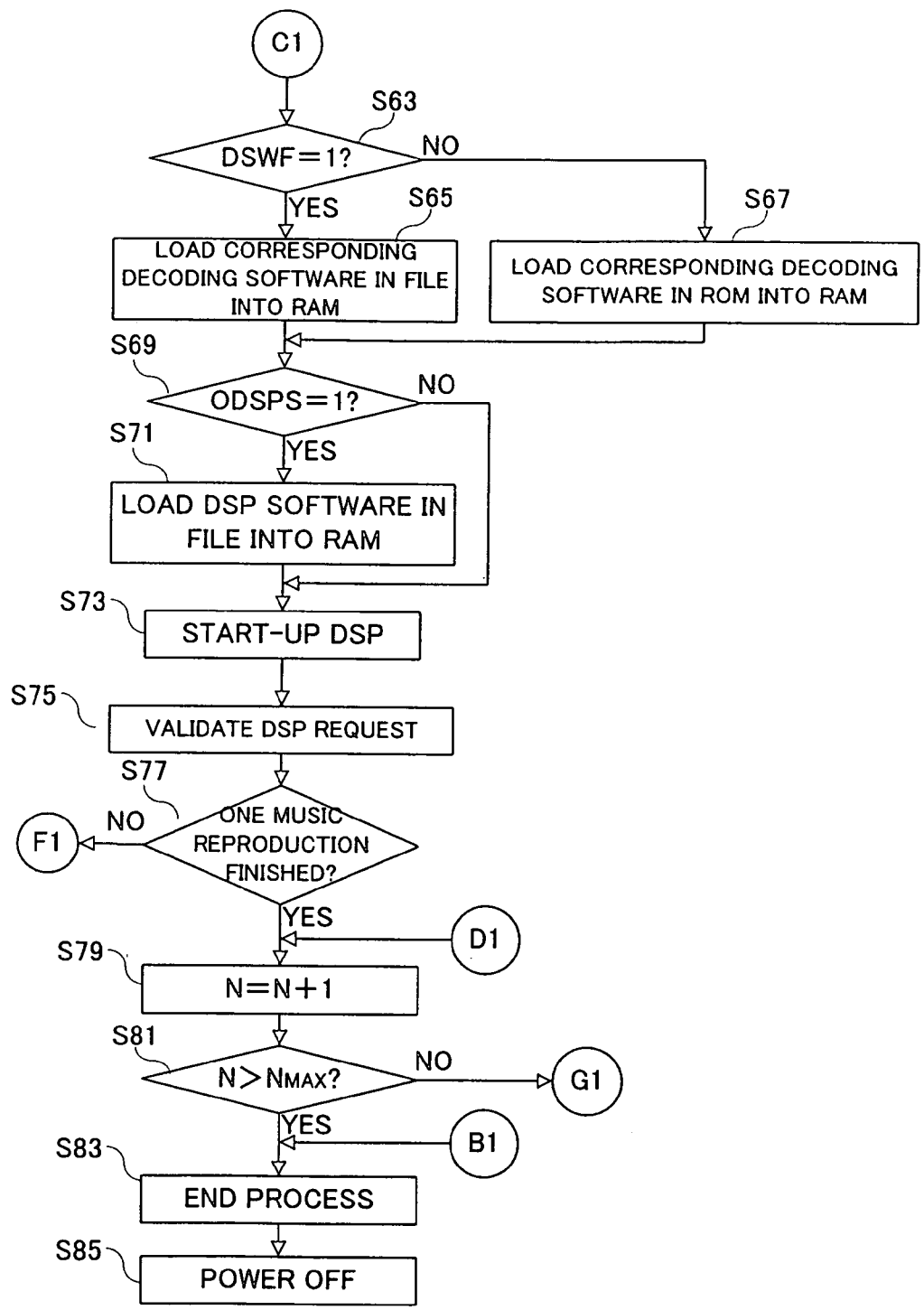
FIG. 12 is a flowchart showing yet still another part of operation of the FIG. 1 embodiment.
Figure 13:
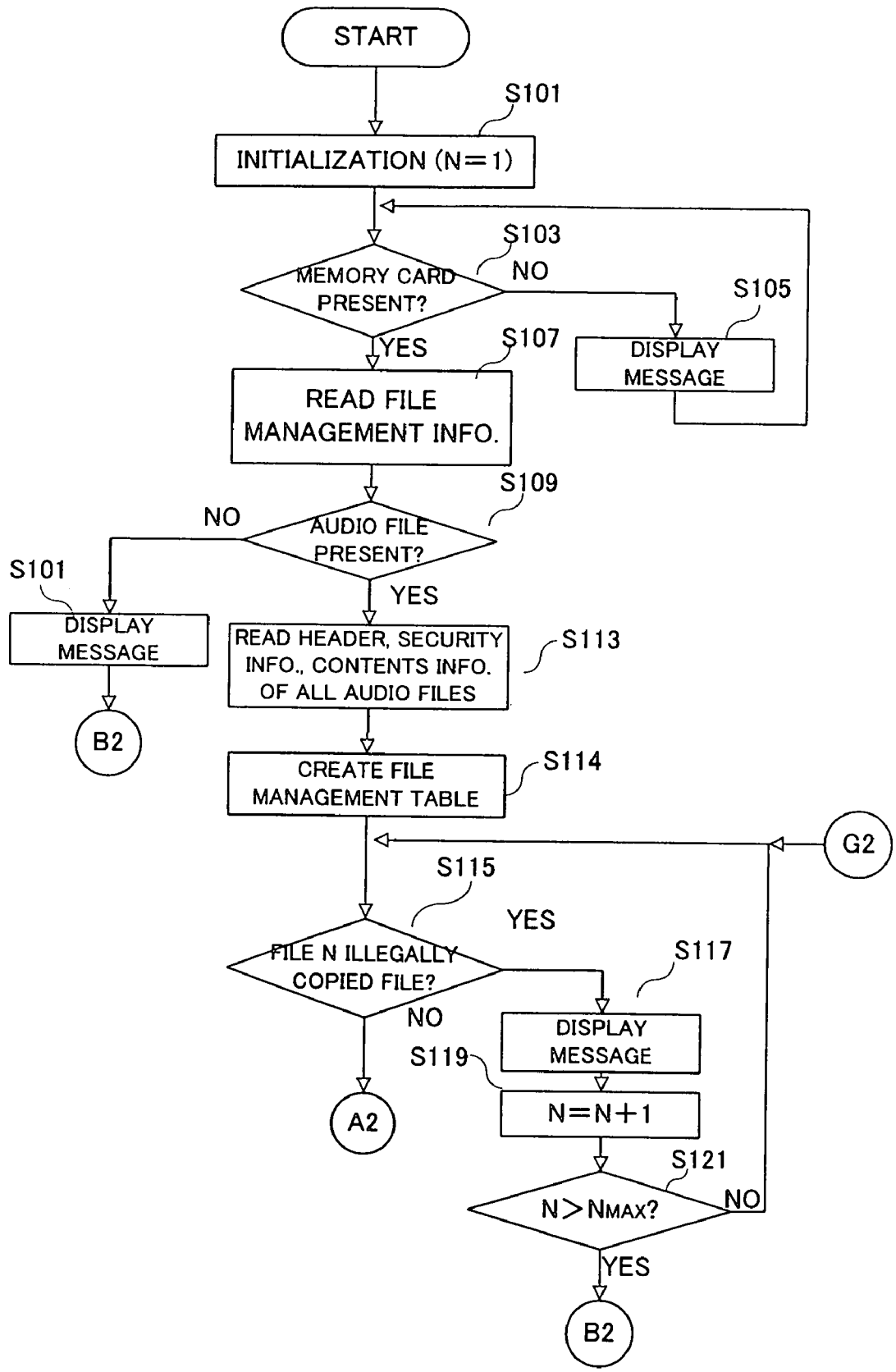
FIG. 13 is a flowchart showing one part of operation of another embodiment of the present invention.
Figure 14:
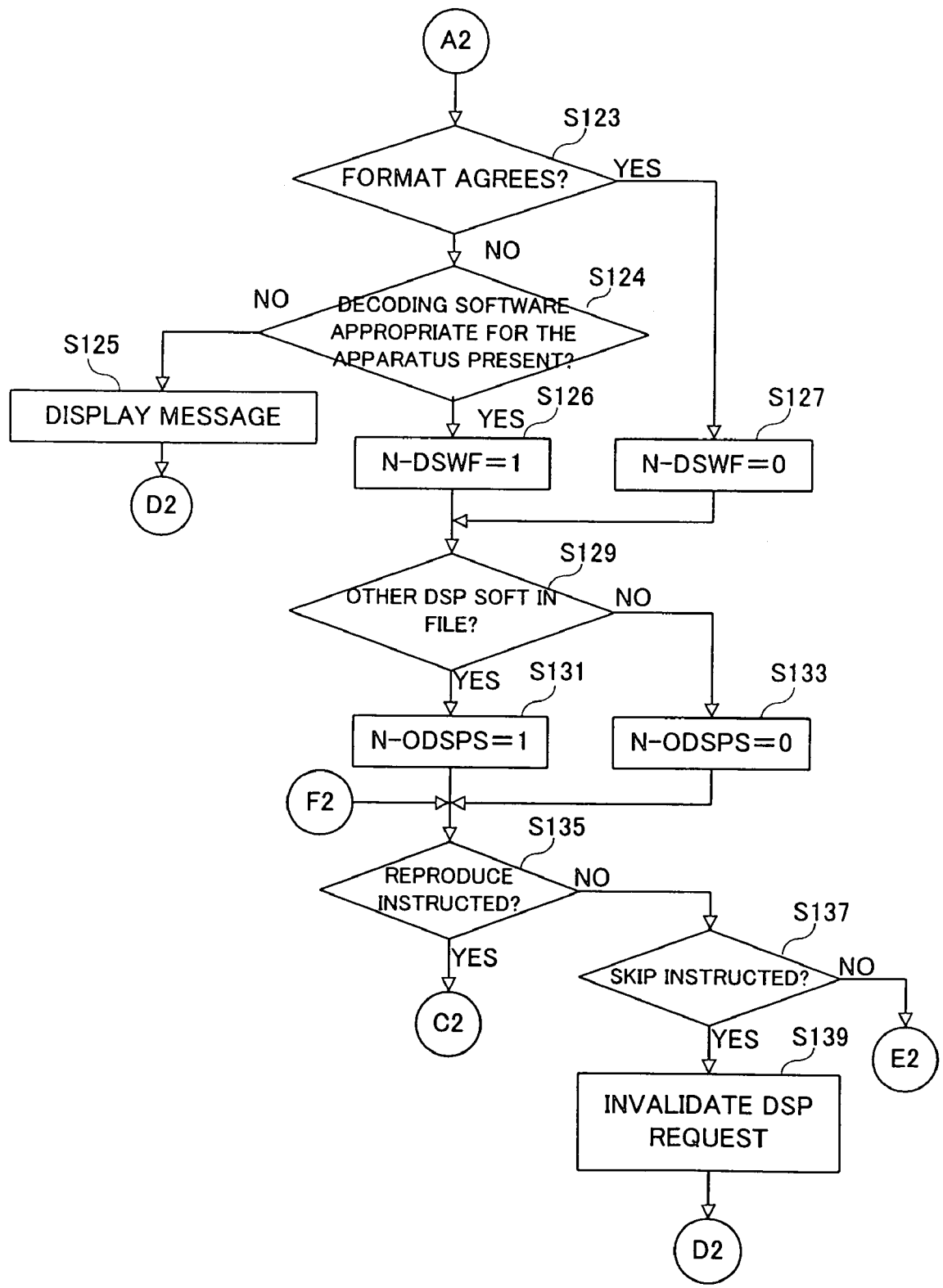
FIG. 14 is a flowchart showing another part of operation of the FIG. 11 embodiment.
Figure 15:
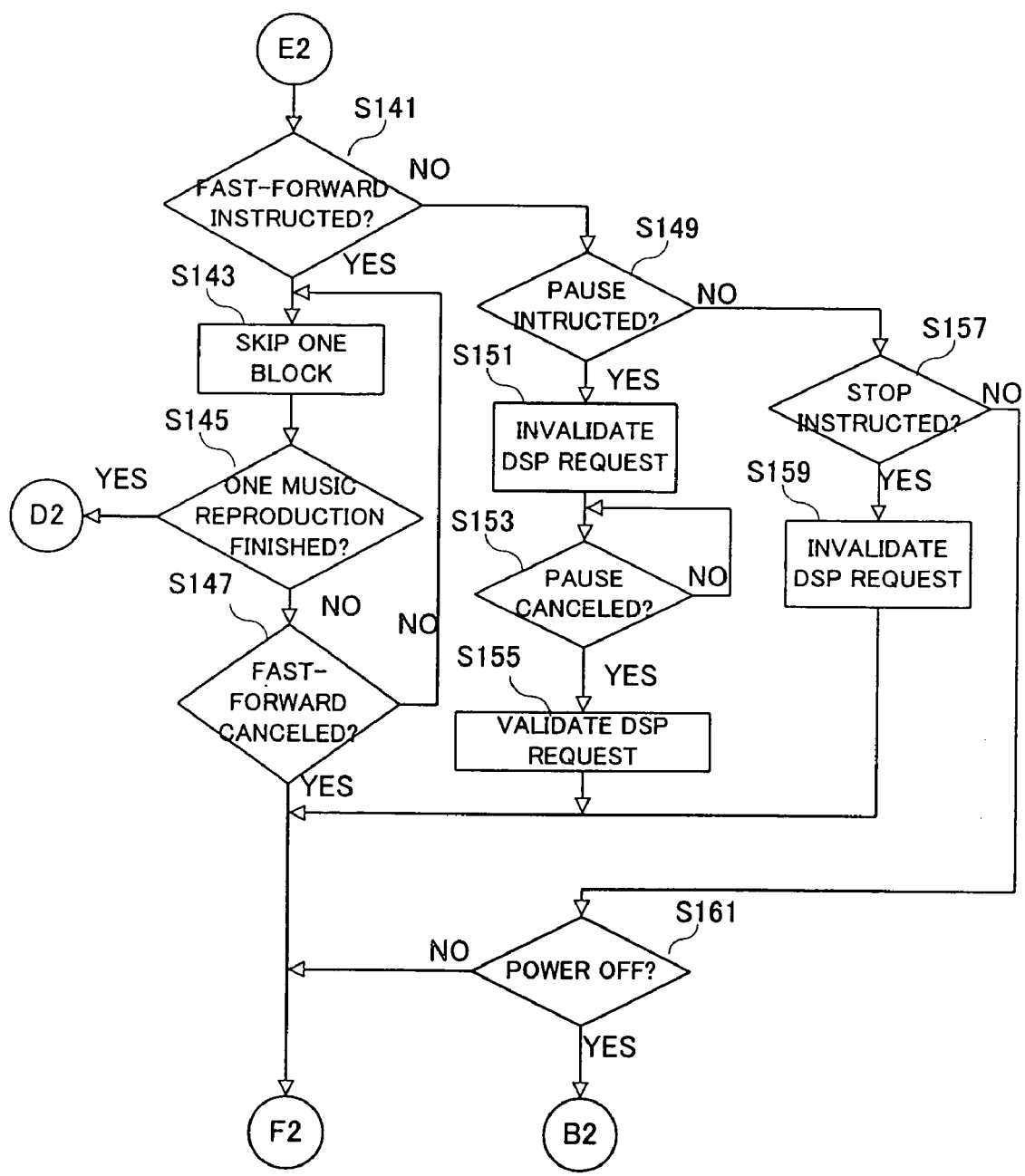
FIG. 15 is a flowchart showing still another part of operation of the FIG. 11 embodiment.

In another embodiment, although the CPU 20 processes flowcharts shown in FIG. 13 to FIG. 16, these processes include many similar processes to FIG. 9 to FIG. 11. Therefore, different processes will be mainly described.

Header, the security information and the contents information of all the audio files are read in a lump in a step S113, and a file management table on which these read information and the audio file numbers are brought into being corresponding each other is created in a step S114. Furthermore, the DSWF flags and ODSP flags are prepared corresponding to the number of the audio files. Subsequently, the corresponding DSWF flag (N-DSWF flag) is set/reset in steps of S126 and S127, and the corresponding ODSPS flag (N-OS-DPS flag) is set/reset in steps of S131 and S133. Furthermore, a state of the N-DSWF flag is determined in a step S163, and a state of the N-ODSPS flag is determined in a step S169. This make it easier to manage an audio file.

Note that at least one decoding software is to be stored in the ROM provided in the DSP in the above embodiment. It may be also possible not to store any decoding software except for a marginal software such as a volume control in the DSP, and always to decode a music data by the decoding software included in the audio file. Furthermore, the present invention can also be applied to contents other than music such as a reading of a book, a lesson in English conversation, etc. In the compression format, there are a plurality of formats respectively appropriate for various sounds such as music and people's speech sound. Therefore, the present invention is especially effective in reproducing music and sounds other than music by a single apparatus.

Furthermore, in the above embodiment, it is arranged that a decoding software corresponding to a compression format of the music data is stored in the same audio file. However, since there are a plurality of encryption formats, a corresponding encryption-breaking software (decryption software) may be stored in the audio file. In addition, in this embodiment, a personal computer is used as a communication terminal 400. However, it may be possible to use a mobile telephone such as PDA (Personal Digital Assistant) instead of a personal computer.

Furthermore, according to the above FIG. 7, the music data and the decoding software are stored in the audio file on the database server. However, on condition that the sound recording reproduction apparatus does not have the decoding software corresponding to the sound data, the decoding software may be stored in the audio file. In this case, upon ordering a music by the operator, it is necessary to send information of a decoding software that the sound recording reproducing apparatus can respond toward a WEB site.

In addition, if, at a time of ordering a music, type information of the DSP is sent to an ordering destination WEB site, and a decoding software appropriate for the DSP is stored in the audio file, NO is not to be determined in the step S24 in FIG. 10.

Furthermore, according to FIG. 7, the audio file received from the database server is written onto a memory card via a hard disk of a communication terminal. However, it may be possible to write the audio file onto the memory card without circulating the hard disk.

According to FIG. 8, the communication terminal previously obtains a plurality of decoding softwares. However, with respect to a decoding software already brought into compatible with the sound recording reproduction apparatus, it is not necessary to obtain it in advance. Furthermore, even in a case that a compatible decoding software is obtained, it is not necessary to store the decoding software in the audio file.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound reproducing apparatus, comprising:
a recording means for recording into a recording medium a data file in which a sound signal encoded in a first format and a first decoding program according to said first format are stored;
a storing means for storing a second decoding program according to a second format;
a determining means for determining whether or not said first format of said sound signal is coincident with said second format of said second decoding program;
a validating means for validating one of said first decoding program and said second decoding program on the basis of a determination result of said determining means;
a decoding means for decoding said sound signal by the decoding program validated by said validating means; and
an outputting means for outputting the decoding sound signal decoded by said decoding means.

2. A sound reproducing apparatus, comprising:
an attacher for detachably attaching a recording medium on which a sound signal encoded in a first format and a first decoding program according to said first format are recorded;
a storage for storing a second decoding program according to a second format;
a determiner for determining whether or not said first format of said sound signal is coincident with said second format of said second decoding program;
a validater for validating one of said first decoding program and said second decoding program on the basis of determination of result of said determiner;
a decoder for decoding said sound signal by the decoding program validated by said validater; and
an outputter for outputting a decoded sound signal decoded by said decoder; wherein
said decoder carries out a first number-of-bit operation,
said recording medium records said first decoding program corresponding to said first number-of-bit operation and said second decoding program corresponding to a second number-of-bit operation,
said validater loads said first decoding program corresponding to said first number-of-bit operation from said recording medium when said determination result represents disagreement,
wherein said second decoding program is not recorded on said recording medium.

* * * * *